(12) United States Patent
Schmidt et al.

(10) Patent No.: US 6,759,987 B2
(45) Date of Patent: Jul. 6, 2004

(54) DEVICE FOR THE TRANSMISSION AND /OR RECEPTION OF RADAR BEAMS

(75) Inventors: Ewald Schmidt, Ludwigsburg (DE); Heinz Pfizenmaier, Murrhardt (DE); Hans Irion, Winnenden (DE); Juergen Hasch, Uhingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/240,586

(22) PCT Filed: Dec. 21, 2001

(86) PCT No.: PCT/DE01/04850

§ 371 (c)(1),
(2), (4) Date: Oct. 2, 2002

(87) PCT Pub. No.: WO02/063333

PCT Pub. Date: Aug. 15, 2002

(65) Prior Publication Data

US 2003/0103009 A1 Jun. 5, 2003

(30) Foreign Application Priority Data

Feb. 3, 2001 (DE) .......................................... 101 04 864

(51) Int. Cl.⁷ ................................................. H01Q 1/38
(52) U.S. Cl. ................................ 343/700 MS; 343/846
(58) Field of Search ........................ 343/700 MS, 846, 343/848, 841, 850, 702

(56) References Cited

U.S. PATENT DOCUMENTS 5,764,189 A    6/1998   Lohninger ........... 343/700 MS

FOREIGN PATENT DOCUMENTS

| DE | 41 30 493 A | 3/1993 | .......... H01Q/13/10 |
| EP | 0 492 357 A | 7/1992 | ............. H01P/5/16 |
| EP | 0 989 628 A | 3/2000 | ............ H01Q/9/04 |
| WO | 96/19737 | 6/1996 | ........... G01S/13/00 |

OTHER PUBLICATIONS

Patent Abstracts of Japan vol. 018, No. 464 (E–1598), Aug. 29, 1994 & JP 06 152237 A, May 31, 1994.

Primary Examiner—Hoang V. Nguyen
(74) Attorney, Agent, or Firm—Michael J. Striker

(57) ABSTRACT

The device has a printed-circuit board (5), on one side of which at least one antenna (1) is located and, on the other side of which electrical circuits (3) are located. An electromagnetic shield between the antenna (1) and the electrical circuits (3) is realized in a manner that is simple with regard for production engineering by locating a feeder network (13, 15)—developed using a coplanar circuit technique and with which the at least one antenna (1) is contacted—on the antenna-side surface of the printed-circuit board (5), and by covering the antenna-side surface of the printed-circuit board (5) with the connected-to-ground outer conductor (45) of the coplanar circuit to such an extent that the required shield between the antenna (1) and the electrical circuits (3) is produced as a result.

8 Claims, 2 Drawing Sheets

DEVICE FOR THE TRANSMISSION AND/OR RECEPTION OF RADAR BEAMS

BACKGROUND OF THE INVENTION

The present invention concerns a device for sending and/or receiving radar beams, whereby at least one antenna is located on one side of a printed-circuit board, and electrical circuits are located on the other side of the printed-circuit board, and means for electromagnetically shielding the electrical circuits from the at least one antenna are provided.

Such a radar device was made known in WO 96/19737. Using the radar device described therein, objects enclosed in a wall or in the soil, for example, can be detected. To ensure that objects enclosed in a wall, such as steel reinforcements, current leads, water lines and the like, are protected against damage when holes are bored in a wall, for example, the craftsman should be provided with precise information about the location, i.e., the path position on the wall surface and the depth in the wall, of an enclosed object. As described in WO 96/19737 as well, a radar device is typically composed of a "front end", i.e., a radar transmitting and receiving unit, and a display device. In the case of the front end disclosed in WO 96/19737, a transmitting antenna and a receive antenna are located on one side of a printed-circuit board, and electrical circuits are located on the other side of the printed-circuit board. The transmitting and receive antenna are developed as horn-like cavities in which loop-shaped wires are installed as radiating elements. An electromagnetic shielding of the electrical circuits on the side of the printed-circuit board opposite to the antenna is provided by means of the walls of the antenna horns that are attached to the side of the printed-circuit board opposite to the electrical circuits. The embodiment of the front end of a radar device described in the printed publication WO 96/19737 is relatively expensive in terms of production engineering, because it is composed of a large number of individual parts.

The invention is based on the object of providing a device for transmitting and/or receiving radar beams of the type mentioned initially, in which the shield between a transmitting and/or receive antenna and electrical circuits can be realized in a very space-saving fashion and using means that are very simple to carry out in terms of production engineering.

SUMMARY OF THE INVENTION

The object mentioned is attained in that a feeder network with which the at least one antenna is contacted and which is developed using a coplanar circuit technique is located on the antenna-side surface of the printed-circuit board and in that the connected-to-ground outer conductor of the coplanar circuit covers the antenna-side surface of the printed-circuit board to such an extent that the required shield between the antenna and the electrical circuits is produced as a result.

According to the invention, the feeder network required for the antenna simultaneously performs the function of electromagnetically shielding the antenna from the electrical circuits on the opposite of the printed-circuit board. Therefore, no additional means for electromagnetic shielding are required that would increase the production-engineering expense for the radar device and also occupy a corresponding amount of space in the device.

The feeder network is developed as a power divider, for example, having a port that is contacted with an electrical circuit on the side of the printed-circuit board opposite to the power divider, and having two further ports that are contacted with two connections of the at least one antenna.

The at least one antenna is preferably composed of a conductive plate acting as radiating element, which said plate is located at a distance above the printed-circuit board. In a very simple embodiment, the conductive plate of the antenna has at least one support that can be fixed in position on the printed-circuit board. It is particularly advantageous that the at least one support establishes an electrical connection between the conductive plate and the feeder network.

The printed-circuit board can be composed of a plurality of stacked dielectric layers having different dielectric constants, whereby the dielectric layer on which the feeder network and the antenna are located has a lower dielectric constant than the dielectric layer on which the electrical circuits are located. In the case of a multilayer printed-circuit board, the electromagnetic shielding can be further increased by situating a grounding conductor between two dielectric layers, which said grounding conductor is interconnected with the outer conductor of the coplanar feeder network via feedthroughs in the printed-circuit board. Likewise, a greater shield effect can be obtained by placing a grounding conductor on the side of the printed-circuit board equipped with the electrical circuits, which said grounding conductor is interconnected via feedthroughs in the printed-circuit board with the outer conductor of the coplanar feeder network and/or with one or more other grounding conductors located inside the printed-circuit board.

BRIEF DESCRIPTION OF THE DRAWINGS

The invention will be described in greater detail below with reference to exemplary embodiments presented in the drawings.

DETAILED DESCRIPTION OF THE PREFERRED EMBODIMENTS

Figure 1:
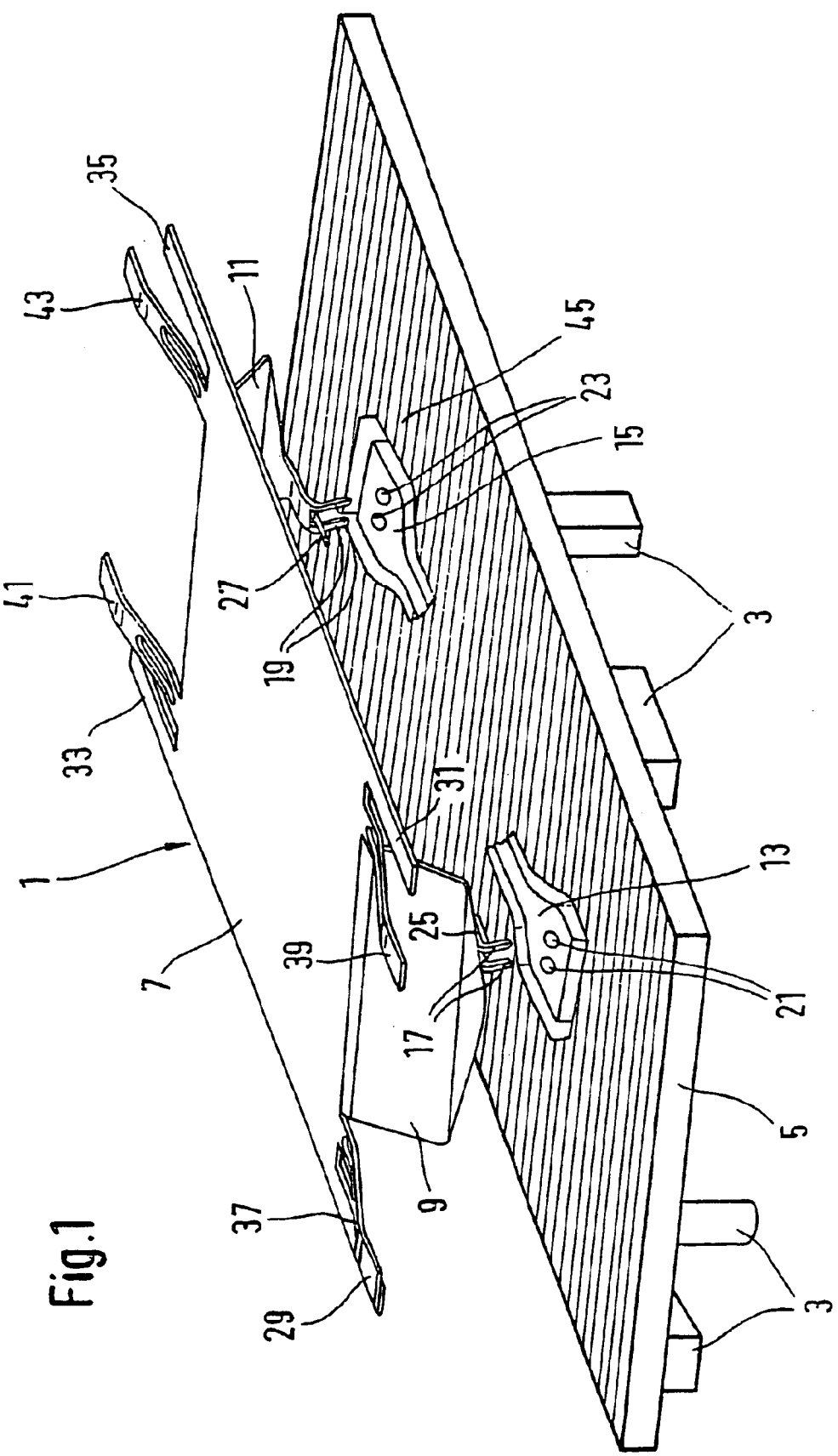
FIG. 1 is a perspective illustration of an antenna above a printed-circuit board.

A perspective illustration of a "front end" of a radar device is presented in FIG. 1, which said front end is used, for example, to detect objects enclosed in a wall. In addition to the front end, a radar device also typically has a display unit on which location information about an object detected in a wall can be presented. The display unit will not be discussed here in further detail, since it is not an object of the invention. A front end is intended to refer to the part of the device in which all transmitting and receive devices are housed. Circuits for the preferably digital processing of the received signals can also be located in the front end.

The front end of the radar device is essentially composed of two subassemblies. The one group of components are electrical circuits for processing high-frequency signals or low-frequency signals or digital signals. The second subassembly of the front end is composed of a transmitting and receive antenna arrangement. The transmission and receiving of radar signals can take place using either a single antenna or separate antennas.

As shown in the perspective illustration in FIG. 1, both subassemblies, i.e., an antenna 1 on the one hand and various circuits 2 on the other are located on a printed-circuit board 3. In fact, the antenna 1 and the circuits 2 are located on opposite sides of the printed-circuit board 3.

In order to more clearly present the exemplary embodiment of an antenna 1 and its connections to a feeder network on the printed-circuit board 5 shown in FIG. 1 in particular, the antenna 1 is shown in an exploded drawing above the printed-circuit board 5.

In a fashion that is advantageous in terms of production engineering, the antenna 1 shown in FIG. 1 is composed of a bent sheet-metal part. The antenna 1 has a conductive plate 7 extending parallel to the printed-circuit board 5 and functioning as radiating element. This conductive plate 7 can have a rectangular shape, as shown in FIG. 1. It can also have a round, oval or similar shape, however. Two sheet-metal segments 9 and 10 are angled on two opposite edges of the conductive plate 1, which said sheet-metal segments function as conduction arms for coupling the antenna to a feeder network on the printed-circuit board 5 and as spacers for the conductive plate 7 above the printed-circuit board 5.

Figure 2:
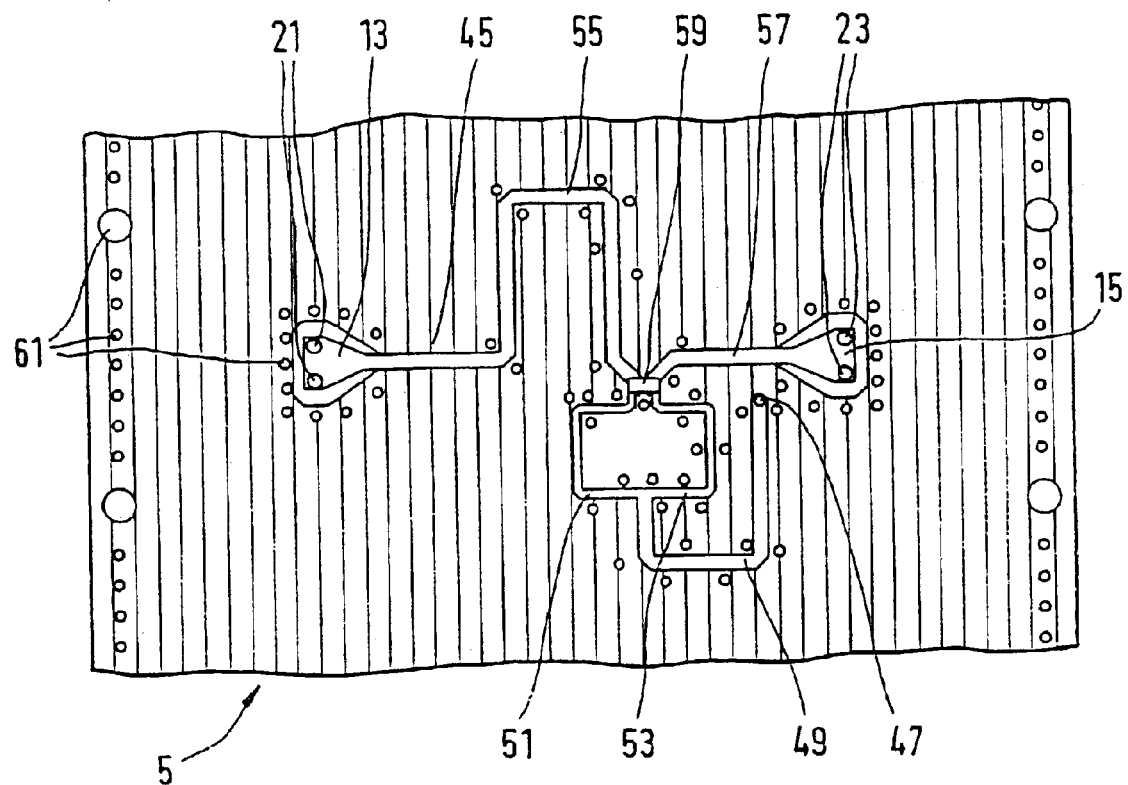
FIG. 2 is a top view of a section of a printed-circuit board having a feeder network.

Only the connection segments 13 and 15 of a planar feeder network on the printed-circuit board 5 are shown in FIG. 1. A detained illustration of an exemplary embodiment of a feeder network is shown in FIG. 2 and will be described in greater detail further below.

The ends of the lateral sheet-metal segments 9 and 11 are bent inward and have contact pins 17 and 19 which are bent in such a fashion that they are positioned at a right angle to the printed-circuit board 5, where they can be inserted in the printed-circuit board 5 in openings 21 and 23 in the area of the connection segments 13 and 15. The contact pins 17 and 19 therefore establish an electrical connection with the connection segments 13 and 15 of the feeder network. The contact pins 17 and 19 inserted in the openings 21 and 23 in the printed-circuit board 5 not only establish an electrical connection between the antenna and the feeder network, however, they also stably fix the antenna 1 into position on the printed-circuit board 5. In deviation from the exemplary embodiment presented in FIG. 1, instead of two contact pins 17 and 19 on the ends of the sheet-metal segments 9 and 11, it is possible to provide just one contact pin or more than two contact pins.

In addition to the contact pins 17 and 19, a solder tail 25, 27 can also be provided on the end of each sheet-metal segment 9 and 11, which said solder tail can be soldered to the connection segment 13, 15 of the feeder network on the printed-circuit board 5. The solder tails 25 and 27 improve the electrical contact as well as the mechanical support of the antenna 1 on the printed-circuit board.

The conductive plate 7 of the antenna 1 is held at a certain distance above the printed-circuit board 5 carrying the feeder network by means of the sheet-metal segments 9 and 11 functioning as spacers. A dielectric having very low permittivity, i.e., air, is therefore located between the conductive plate 7 and the printed-circuit board 5, by way of which a very broad-band operation of the antenna is made possible. The band width of the antenna 1 can be optimized by providing the conductive plate 7 with tab-like extensions 29, 31, 33, 35, 37, 39, 41 and 43 in addition to the conduction arms 9 and 11, as shown in FIG. 1. In the exemplary embodiment shown, two extensions 29, 37; 31, 39; 33, 41 and 35, 43 are located adjacent to each other in each case. The adjacent placement of two extensions improves the adaptation of the antenna in the direction of lower frequency ranges. In deviation from the exemplary embodiment shown, just one extension 29, 31, 33, 35 can be provided in each case on the side of the conduction arms 9 and 11. Even one of them brings about an adaptation that improves the band width of the antenna 1. If a very broad-band operation of the antenna 1 is not required, all extensions can be eliminated.

In the case of the antenna 1 shown in FIG. 1 as an example, one of the extensions 37, 39, 41, 43 is bent to extend above the plate 7 on every corner of the conductive plate 7. The upwardly bent extensions 37, 39, 41, 43 can support the antenna 1 against a housing wall covering the antenna, for example. As a result, the antenna 1 is provided with a defined stable position in a (not shown in the drawing) housing in which the printed-circuit board 5 with the antenna 1 and the electrical circuits 3 are accommodated.

The radar device according to the invention is not bound to an antenna according to the exemplary embodiment shown in FIG. 1. An essential feature of an antenna capable of being used here lies in the fact that the conductive plate 7 functioning as radiating element is held at a distance above the printed-circuit board 5. One or more supports for the conductive plate can be provided—regardless of their design—which can be fixed in position on the printed-circuit board and hold the conductive plate of the antenna at a distance above the printed-circuit board 5. It is particularly advantageous when these supports not only mechanically fix the antenna into position on the printed-circuit board 5, but they also establish an electrical connection between the antenna and the feeder network on the printed-circuit board 5. Due to the fact that, according to the exemplary embodiment of the antenna 1 shown in FIG. 1, more than just one support (sheet-metal segments 9, 11 with contact pins 17, 19) are present, the antenna 1 is provided with greater stability on the printed-circuit board 5.

Any type of network developed using a planar circuit technique can be applied on the printed-circuit board 5 as the feeder network that is capable of forwarding transmitted signals to the antenna 1 and/or decoupling received signals, and establishing a connection with the electrical circuits 3 on the opposite side of the printed-circuit board 5.

Because the antenna 1 shown in FIG. 1 has two connections, the feeder network must be a power divider that divides a transmitted signal into two signal portions in phase opposition, for example, and couples them into the conduction arms 9 and 11 of the antenna 1. If the antenna 1 is also used as a receive antenna, the same power divider also combines the signal portions that are in phase opposition and decoupled from the conduction arms 9 and 11 into one common received signal.

An exemplary embodiment of such a power divider is shown in FIG. 2, which is a top view of the antenna-side surface of the printed-circuit board 5. The power divider is developed using a coplanar circuit technique. Coplanar circuits are composed in known fashion—as described in EP 0 492 357 A1, for example, which describes a coplanar divider—of an inner conductor and an outer conductor separated from it by a slit, which said outer conductor is usually connected to ground. The power divider shown in FIG. 2 is formed by an inner conductor structure that is enclosed on all sides by an outer conductor 45 that is connected to ground. The inner conductor is separated from the outer conductor 45 on both sides via a slit. By using this circuit technique it is possible to cover the surface of the printed-circuit board 5 nearly completely with the outer conductor 45 that is connected to ground. The outer conductor 45 is indicated in FIGS. 1 and 2 as hatching on the surface of the printed-circuit board 5.

Due to the fact that, in the case of the feeder network developed using a coplanar circuit technique, the printed-circuit board 5 is completely metallized with a metal film except for the slit bordering the inner conductor, an electromagnetic shield is produced in very simple fashion between the antenna 1 and the circuits 3 on the opposite side of the printed-circuit board 5. The feeder network developed using a coplanar circuit technique therefore performs the function of a signal connection between the antenna 1 and the electrical circuits 3 on the opposite side of the printed-circuit board 5, on the one hand, and, on the other, it performs the function of an electromagnetic shield between the antenna 1 and the electrical circuits 5.

The power divider shown in FIG. 2 has a first port 47 that is interconnected via feedthroughs with high-frequency circuits on the opposite side of the printed-circuit board 5. From this first port 47, a circuit 49 leads to a tee junction having two symmetrical branch circuits 51 and 53. Branch circuit 51 transitions into a second circuit 55 that leads to the connection segment 13 for the antenna 1 and forms a second port. The other branch circuit 53 transitions into a third circuit 57, which leads to the connection segment 15 that is interconnected with the antenna 1 and forms a third port. The tee junction is symmetrical in design, and its branch circuits 51 and 53 are bridged by a resistor 59 (e.g., a chip resistor) on its ends at which they transition into the two circuits 55 and 57. A power divider designed in this fashion is also referred to as a Wilkinson divider. Such a Wilkinson divider is described in U.S. Pat. No. 5,489,880, for example. The bridging between the two branch circuits 51 and 53 with a resistor 59 can also be eliminated. The first circuit 55 leading to the connecting segment 13 is extended by $\lambda/2$ as compared with the second circuit 57, so that a 180° phase displacement results between the signal portions occurring at the two connection segments 13 and 15. The circles shown in FIG. 2 represent feedthroughs 61, via which a ground connection is established between the outer conductor 45 and, possibly, another one or more further grounding conductors located in other planes of the printed-circuit board 5.

Figure 3:
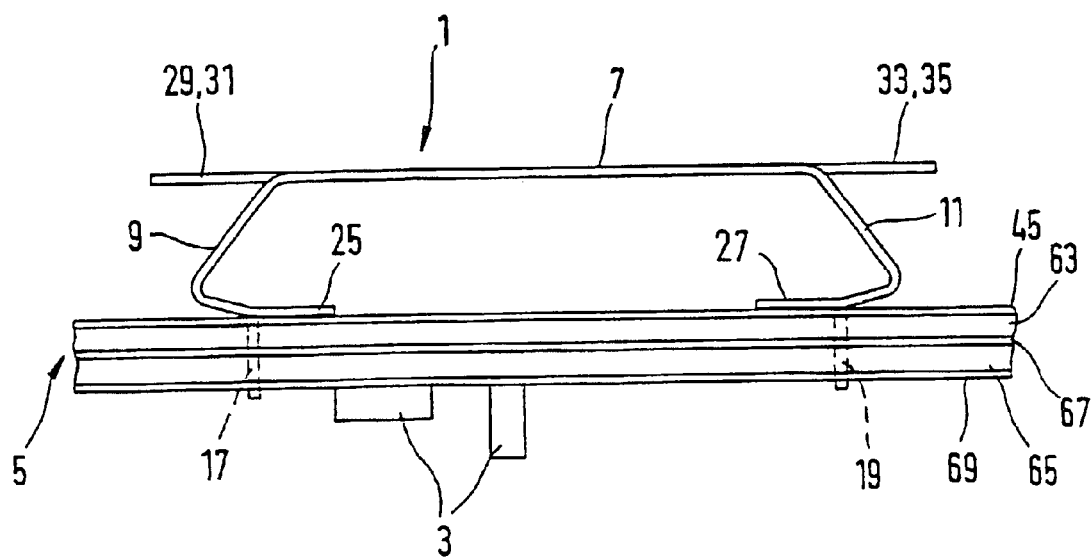
FIG. 3 is a side view of a printed-circuit board having an antenna on the top and electrical circuits on the bottom.

FIG. 3 is a side view of a printed-circuit board 5 with an antenna 1 located on it, as has been described in conjunction with FIG. 1, and having electrical circuits 3 located on the opposite side. The special feature of the printed-circuit board 5 lies in the fact that it is composed of a plurality of stacked dielectric layers 63 and 65. The dielectric layers 63 and 65 have different dielectric constants. The dielectric layer 63 adjacent to the antenna 1 should have a low dielectric constant (e.g., $\delta, \approx 4$), and the dielectric layer 65 adjacent to the electrical circuits should have a high dielectric constant (e.g., $\epsilon, \approx 10$). A dielectric with a low dielectric constant guarantees a high band width for the antenna 1, and a high dielectric constant is required for high-frequency circuits on the other side of the printed-circuit board in order to obtain high quality and high band width. Both dielectric layers 63 and 65 should be separated from each other by a grounding conductor 67.

The grounding conductor 67 located between two dielectric layers 63 and 65 is to be connected via feedthroughs with the metallization 45 forming the outer conductor of the coplanar feeder network. This grounding conductor 67 also contributes to an electromagnetic shield between the antenna 1 and the electrical circuits 3. Furthermore, a grounding conductor 69 can also be provided on the surface of the printed-circuit board 5 equipped with the electrical circuits. This grounding conductor 69 is also to be interconnected via feedthroughs with the middle grounding conductor 67 and the outer conductor 45 of the coplanar feeder network.

The printed-circuit board 5 can also be composed of more than just two plies of dielectric layers, between which a plurality of grounding conductors contacted with each other can be located as well.

What is claimed is:

1. A device for sending and/or receiving radar beams, whereby at least one antenna (1) is located on one side of a printed-circuit board (5) and electrical circuits (3) are located on the other side of the printed-circuit board (5), and means (45) for electromagnetically shielding the electrical circuits (3) from the at least one antenna (1) are provided, wherein a feeder network (45, 49, 51, 53, 55, 57)—developed using a coplanar circuit technique and with which the at least one antenna (1) is contacted—is provided on the, antenna-side surface of the printed-circuit board (5), and wherein the connected-to-ground outer conductor (45) of the coplanar circuit covers the antenna-side surface of the printed-circuit board (5) to such an extent that the required shield between the antenna (1) and the electrical circuits (3) is produced as a result.

2. The device according to claim 1, wherein the feeder network is developed as a power divider having a port (47) that is contacted with an electrical circuit on the side of the printed-circuit board (5) opposite to the power divider, and having two further ports (13, 15) that are contacted with two connections (17, 19) of the at least one antenna.

3. The device according to claim 1, wherein the antenna (1) composed of a conductive plate (7) functioning as a radiating element that is located at a distance above the printed-circuit board (5).

4. The device according to claim 3, wherein the conductive plate (7) of the antenna (1) has at least one support (9, 11) that can be fixed in position on the printed-circuit board (6).

5. The device according to claim 2, wherein the at least one support (9, 11) establishes an electrical connection between the conductive plate (7) and the feeder network (45, 49, 51, 53, 55, 57).

6. The device according to claim 1, wherein the printed-circuit board (5) is composed of a plurality of stacked dielectric layers (63, 65) having different dielectric constants, whereby the dielectric layer (63) on which the feeder network (45, 49, 51, 63, 55, 57) and the antenna (1) are located has a lower dielectric constant than the dielectric layer (65) on which the electrical circuits (3) are located.

7. The device according to claim 1, wherein a grounding conductor (67) is located between two dielectric layers (63, 65) and is interconnected with the outer conductor (45) of the coplanar feeder network (46, 49, 51, 53, 55, 57) via feedthroughs (61) in the printed-circuit board (5).

8. The device according to claim 1, wherein a grounding conductor (69) is applied on the side of the printed-circuit board (5) equipped with the electrical circuits (3), which said grounding conductor is interconnected with the outer conductor (45) of the coplanar feeder network (45, 49, 51, 53, 55, 57) and/or with one or more other grounding conductors (67) located inside the printed-circuit board (5) via feedthroughs (61) in the printed-circuit board.

* * * * *